United States Patent [19]

Stonehart et al.

[11] Patent Number: 5,374,598

[45] Date of Patent: Dec. 20, 1994

[54] PROCESS OF PREPARING METAL SUPPORTED CATALYST HAVING HIGH SURFACE AREA

[75] Inventors: Paul Stonehart, Madison, Conn.; Kazunori Tsurumi, Hiratsuka, Japan

[73] Assignees: Tanaka Kikinzoku Kogyo K.K., Japan; Stonehart Associates Inc., Madison, Conn.

[21] Appl. No.: 989,151

[22] Filed: Dec. 11, 1992

[30] Foreign Application Priority Data

Dec. 13, 1991 [JP] Japan .................................. 3-351355

[51] Int. Cl.$^5$ .......................... B01J 21/18; B01J 23/42
[52] U.S. Cl. ..................................... 502/185; 502/339; 502/344

[58] Field of Search ........................ 502/185, 339, 344

Primary Examiner—Anthony McFarlane
Attorney, Agent, or Firm—Klauber & Jackson

[57] ABSTRACT

Disclosed herewith is a process of preparing a metal supported catalyst having a high surface area comprising reducing one or more metal-containing ions in a solution employing one or more reducing agents selected from the group consisting of thiourea and thioacetamide, and supporting the reduced metal or metals onto a support. The thiourea and the thioacetamide exhibit more excellent activity and durability than those of ordinary reducing agents such as sodium borohydride and other sulfur-containing reducing agents.

7 Claims, No Drawings

PROCESS OF PREPARING METAL SUPPORTED CATALYST HAVING HIGH SURFACE AREA

BACKGROUND OF THE INVENTION

The present invention relates to a process of preparing a metal supported catalyst by supporting various catalyst metals on a support, especially to a process of reducing an ion containing the metal.

A catalyst comprising an inorganic oxide support such as silica and alumina, and an individual noble metal such as platinum, gold and palladium or the combination thereof supported thereon has heretofore been employed as that for various chemical reactions and for an electrode of a fuel cell. Another catalyst comprising a carbon support and the same catalyst noble metals supported thereon has been also employed.

The catalyst performance of these catalysts depends on the degree of dispersion of the catalysts metals and the performance (specific activity) is promoted with the increase of the surface area of the catalyst if the same amount of the catalyst metals is supported thereon.

In preparing the above catalysts, the metal elements are supported onto the inorganic support by reducing the ions containing the catalyst metals to be supported, to the metal elements by means of a reducing agent.

Since however, such a reducing agent as lithium aluminum hydride and sodium borohydride ordinarily employed is too strong, the particle size of the metals produced by the reduction increases and the particle size distribution becomes broader.

In other words, the conventional method has the drawbacks such that the number of the particles decreases to lower the surface area per unit weight of the metal so that the catalytic activity is also made to be lowered, and the particle size becomes considerably uneven.

Various kinds of alloy catalysts having high catalytic activity have been heretofore proposed after the investigation of the combination of supported metals (for example, Japanese patent application No. 59-141169).

However, even in these catalysts, the catalyst metals thereof are requested to have a small particle size, that is, a large specific surface area for elevating the activity.

Moreover, the alloy catalysts are generally prepared by alloying an alloy component with a noble metal already supported on the support. It is important from this viewpoint to prepare the catalyst supported with a high surface area noble metal having narrow particle size distribution, that is, a uniform particle size.

Having the uniform particle size is important to obtain an alloy catalyst having particles of uniform alloy composition.

These catalysts have the drawback that they are likely to be exposed to a high temperature so that the activity may be lost with the lapse of time to shorten the catalyst life if they do not have the resistance to a sintering reaction.

In order to overcome these drawbacks, such a sulfur-containing and relatively weak reducing agent as a thiosulfate salt and a metabisulfite has been proposed (U.S. Pat. No. 4,956,331 and European patent publication No. 0329628). Although these sulfur-containing reducing agent exhibit more excellent catalytic activity and resistance, another reducing agent having much more excellent activity and resistance is of course desirable.

SUMMARY OF THE INVENTION

An object of the present invention is to provide a process of preparing a metal supported catalyst having a high surface area and high durability.

Another object of the invention is to provide a process of preparing a catalyst by reducing a metal-containing ion by means of a sulfur-containing reducing agent other than the conventional ones.

In accordance with one aspect of this invention, there is provided a process of preparing a metal supported catalyst having a high surface area which comprises treating a solution of a metal-containing ion or ions or the mixture of the said solution of the metal-containing ion or ions and a support with one or more reducing agents selected from thiourea and thioacetamide, reducing the metal-containing ions to the corresponding metals having a high surface area to be supported or deposited onto the support, and separating the support from the said solution.

In the present invention, the ions containing the catalyst metals are reduced with such a sulfur-containing and relatively weak reducing agent as thiourea or thioacetamide when one or more of the catalyst metals including, for example, platinum are supported onto the carbon support or the inorganic oxide support.

Thereby, the particle size of the supported metals to be deposited decreases and becomes uniform compared with that when such a strong reducing agent as sodium borohydride is employed.

This tendency becomes much more remarkable because the metal particles grow around the sulfur atoms liberated during the reduction process, which serve as nuclei.

It is possible to effectively utilize the catalyst metals because the catalyst metals formed on the inorganic support and having a large surface area can be sufficiently in contact with a reactant to promote the specific catalytic activity.

Further the catalyst metals formed according to the present invention are considered to have large durability against a sintering reaction which is expected to lower the surface area of the catalyst metals with time because the thermodynamic driving force of the reaction between the metal-containing ion and the sulfur-containing reducing agent is smaller than that of the prior art, to form the fine crystal particles with less defects.

When a second and a third metal is further supported onto the noble metal supported catalyst and alloyed therewith, the composition of the particles after the alloying becomes nearly uniform so that the desired composition can be attained for the individual particles because the particle size of the noble metal produced in the process of this invention is uniform.

DETAILED DESCRIPTION OF THE INVENTION

The most characteristic feature of this invention is in that, when the ion or ions which contain the catalyst metals, for example, a chloroplatinic ion are reduced to support the catalyst metals onto a carbon support or an inorganic oxide support such as silica and alumina, one or more sulfur-containing reducing agents which are relatively weak in reducing ability are employed.

As an inorganic support of this invention, a carbon support of which a main component is a carbon element having any form such as carbon black, graphite and activated carbon; and a fire resistant inorganic oxide support such as silica and alumina may be employed.

Since the inorganic support is utilized for a catalyst support, it is preferably fine particles having a large surface area, for instance, of 30 to 2000 m²/g and desirably having a particle size of 100 to 5000 Å.

As a carbon support, for example, commercially available Acetylene Black (trade name: Shawinigan Acetylene Black and Denka Acetylene Black), electroconductive carbon black (trade name: Vulcan XC72R) and graphitized carbon black (trade name; Denka Black or the like).

Such a noble metal as platinum, gold and palladium can be preferably employed as a metal to be supported onto the inorganic support of this invention, and other metals may also be employed. The ions containing these metals include the said individual metal ions; and the complex ions of these metals such as a chloroplatinic ion, a chloroauric ion and a palladium chloride ion.

Reduction of the metal-containing ion will be described taking the chloroplatinic ion as an example.

The way of supporting the platinum metal itself can be carried out according to any conventional method. One of the conventional methods comprises mixing the carbon support or the inorganic oxide support with a chloroplatinic acid aqueous solution, reducing the chloroplatinic ion and supporting the reduced platinum metal onto the support; and another comprises, prior to the mixing with the support, reducing the chloroplatinic acid and supporting the reduced platinum onto the supports. However, if a strong reducing agent is employed in these reactions for reduction, the size of platinum particles increases so that the surface area of the particles per unit weight considerably decreases.

For this reason, such a weak reducing agent as thiourea and thioacetamide is employed to depress the decrease of the surface area of the platinum.

The thiourea or the thioacetamide reacts with the platinum-containing ion in the aqueous solution, that is, the chloroplatinic ion to form finely divided metal sol having a large surface area.

With the progress of the reaction, the solution turns from yellow to orange, and with the further growth of the metal fine crystals for several hours, the solution gradually becomes darker.

Light passing through the solution exhibits the Tyndall effect showing the existence of colloidal particles.

This sol is then adsorbed onto the carbon support or the inorganic oxide support to provide the inorganic support supported with the platinum through appropriate procedures such as drying.

In other words, when the solution becomes nearly opaque, the carbon support and the like are added into the solution and then the liquid phase of the formed slurry is forced to penetrate into the pores of the inorganic support by agitation employing, for example, an ultrasonic agitator.

The thicker slurry is formed by this procedure, which remains suspended and seldom precipitates.

Different from the above procedures, after the chloroplatinic acid solution is initially added to the support to prepare the slurry, the formed slurry is well agitated and dispersed, for example, with an ultrasonic agitator, a small amount of the thiourea and/or thioacetamide aqueous solution may be initially added gradually and the rest of the solution may be added at once to reduce and deposit the platinum-containing ion to platinum under the existence of the support.

Drying of thus obtained slurry e.g. at 75° to 80° C. for one to three days for removing water provides dry powder containing the salt of a reaction by-product.

The by-product may be dissolved and removed by extracting the dry powder several times with, for instance, 100 to 200 ml of distilled water.

In case of the graphitized carbon black support, the said slurry precipitates and can be separated from the aqueous phase by discharging the aqueous phase. After the procedure is repeated several times, the catalyst is dried overnight at about 110° C.

The catalyst thus prepared has a large surface area and its particle size is uniform.

In place of the above procedures, a slurry-filtration-washing process can be utilized.

This can be used in the case of acetylene black or the like which does not easily precipitate.

For example, according to the process, an aqueous solution of 1g-Pt/100 ml of chloroplatinic acid is reacted with an aqueous solution of 0.4 g/25 ml of thiourea or the like to produce a catalyst supported with platinum of which a specific surface area is 185 m2/g and of which a particle size is uniform.

Since the thermodynamic driving force of the reaction between the chloroplatinic ion and the thiourea or the like is smaller than that of the prior art and fine crystal particles with less defects can be produced, the catalyst particles produced in this process are considered to have larger durability against a sintering reaction in which the surface area of platinum decreases with time.

The fine particles having a uniform particle size of not more than 15 Å can be obtained by the above mentioned reaction between the thiourea or the like and the chloroplatinic acid.

Relatively weak reducing agents which can be employed in the process of the present invention other than the above mentioned thiourea include thioacetamide. The thioacetamide can reduce the metal-containing ion in a similar manner.

The well dispersed catalyst particles can be obtained both in the process in which the platinum-containing ion is reduced prior to the impregnation of the platinum-containing solution into the carbon support and in the other process, contrary to the above process, in which the platinum-containing ion is reduced after the impregnation.

In place of supporting one kind of metal such as platinum, gold and palladium, a solution containing two or more metal-containing ions can be employed so that these metals can be supported at the same time.

In the above process, it may be possible to initially support only one metal which is then alloyed with another metal.

It is possible, when the carbon support is employed as an inorganic support, to depress the decrease of the surface area due to movement and agglomeration of the supported metals, when employed at a high temperature, by carburizing the supported metals of the carbon support formed to enhance the affinity between the carbon support and the supported metals.

EXAMPLES

The present invention will be now described in detail in connection with the following Examples showing the preparation of the platinum alloy catalyst according to the present invention. However, these Examples are not intended to limit the scope of the present invention.

Example 1

Chloroplatinic acid containing 1.157 g of platinum was dissolved in 300 ml of water to which was added 75 ml of a solution dissolving 0.5 g of thiourea ($H_2NCSNH_2$). The solution was further stirred at 27° C.

With the lapse of time, the mixed solution became from yellow to orange, further to dark orange.

After the lapse of three hours, the room was darkened and the light of an electric bulb was applied to the vessel, then the scatter of the light was observed.

The slurry in which 10 g of Acetylene Black for the catalyst support was suspended in 100 ml of pure water was added to the above mixed solution.

The slurry was stirred for two minutes with an ultrasonic agitator so that the mixed solution was forced to penetrate into the pores of the support.

The slurry was kept to be suspended and did not precipitate during the stirring operation.

The slurry was dried in an oven at 75° to 80° C. overnight for removing water. The dry powder thus obtained was washed three times with about 200 ml of distilled water so that the by-products were extracted and removed.

The slurry was further dried at 70° C. overnight to obtain the carbon support supported with the platinum.

The average platinum size of the platinum-carbon catalyst thus obtained was 15 Å, and the particle size of the platinum particles was found to be nearly uniform by observing the catalyst with a transmission type electron microscope. The specific surface area of the platinum was 185 $m^2/g$, and the supported platinum was 10% in weight according to an electrochemical hydrogen adsorption-desorption method.

Comparative Example 1

Platinum was supported by the same procedures as those of Example 1 except that $Na_2BH_4$ was employed instead of the thiourea of Example 1.

The average platinum size of the platinum-carbon catalyst thus obtained was 48 Å, and the platinum particles had broad particle distribution of 20 to 100 Å according to the observation with an electron microscope. The specific surface area of the platinum was 56 $m^2/g$, and the supported platinum was 10% in weight.

Comparative Example 2

Platinum was supported by the same procedures as those of Example 1 except that 3 g of sodium thiosulfate pentahydrate was employed instead of the thiourea of Example 1.

The average platinum size of the platinum-carbon catalyst thus obtained was 18 Å, and the platinum particles had narrow particle distribution according to the observation with an electron microscope. The specific surface area of the platinum was 155 $m^2/g$, and the supported platinum was 10% in weight.

Example 2

Platinum was supported on the carbon support by the same procedures as those of Example 1 except that thioacetamide ($CH_3CSNH_2$) was employed instead of the thiourea of Example 1.

The average platinum size of the platinum-carbon catalyst thus obtained was 15 Å, and the particle size of the platinum particles was found to be uniform by observing the catalyst with an electron microscope. The specific surface area of the platinum was 155 $m^2/g$, and the supported platinum was 10% in weight.

Example 3

Gold was supported on the carbon support by the same procedures as those of Example 1 except that chlorauric acid was employed instead of the chloroplatinic acid of Example 1.

The average gold size of the gold-carbon catalyst thus obtained was 17 Å, and the particle size of the gold particles was found to be uniform by observing the catalyst with an electron microscope. The specific surface area of the gold was 165 $m^2/g$, and the supported gold was 10% in weight.

Example 4

Palladium was supported on the carbon support by the same procedures as those of Example 1 except that 300 ml of an aqueous solution which had been prepared by dissolving palladium chloride containing 1.157 g of palladium in a small amount of hydrochloric acid which was then diluted with pure water was employed instead of the chloroplatinic acid of Example 1 and that 40 ml of an aqueous solution of 0.85 g of thiourea was employed.

The average palladium size of the palladium-carbon catalyst thus obtained was 13 Å, and the particle size of the palladium particles was found to be uniform by observing the catalyst with an electron microscope. The specific surface area of the palladium was 308 $m^2/g$ according to a carbon monoxide adsorption method, and the supported palladium was 10% in weight.

Example 5

Platinum was supported on an alumina support by the same procedures as those of Example 1 except that γ-alimina powder for a catalyst support was employed in place of the Acetylene black of Example 1 and that the drying after the washing was performed at 120° C.

The average platinum size of the platinum-alumina catalyst thus obtained was 17 Å. The specific surface area of the platinum was 165 $m^2/g$ according to a carbon monoxide adsorption method, and the supported platinum was 10% in weight.

What is claimed is:

1. A process of preparing a metal supported catalyst having a high surface area, comprising reducing one or more metal-containing ions in a solution, employing as the sole reducing means in said process one or more weak reducing agents selected from the group consisting of thiourea and thioacetamide; and supporting the reduced metal or metals onto a support.

2. A process as defined in claim 1, wherein the support is a carbon support.

3. A process as defined in claim 1, wherein the support is an inorganic oxide support.

4. A process as defined in claim 1, wherein the metal or metals contained in the metal-containing ions are selected from the group consisting of platinum, gold and palladium.

5. A process of preparing a metal supported catalyst having a high surface area, comprising the steps of: adding as the sole reducing means in said process at least one weak reducing agent selected from the group consisting of thiourea and thioacetamide to a solution of a catalytic metal salt for reduction of metal ions in said salt; allowing said metal ions to be reduced; and thereafter adding particles of a material upon which said reduced metal ions are deposited.

6. A process of preparing a metal supported catalyst having a high surface area, comprising the steps of: reducing one or more metal-containing ions, of a metal selected from the group consisting of platinum, gold and palladium, in a solution comprising as a weak reducing agent thioacetamide, said thioacetamide being the sole reducing means in said process; and supporting the reduced metal or metals onto a support.

7. A process of preparing a metal supported catalyst having a high surface area, comprising the steps of: reducing one or more metal-containing ions, of a metal selected from the group consisting of gold and palladium, in a solution comprising as a weak reducing agent thiourea, said thiourea being the sole reducing means in said process; and supporting the reduced metal or metals onto a support.

* * * * *